3,773,876
METHOD FOR MAKING PACKAGING MATERIAL
Klaus Ferdinand Rath, Am Weiher 20, Opladen, Germany, and Hans-Jürgen Rückert, Genkler Hardt 10, Lantenbach, Germany
Filed Mar. 23, 1971, Ser. No. 127,163
Claims priority, application Germany, Mar. 26, 1970, P 20 14 667.2
Int. Cl. B29d 27/00; B32b 27/10
U.S. Cl. 264—47                                       1 Claim

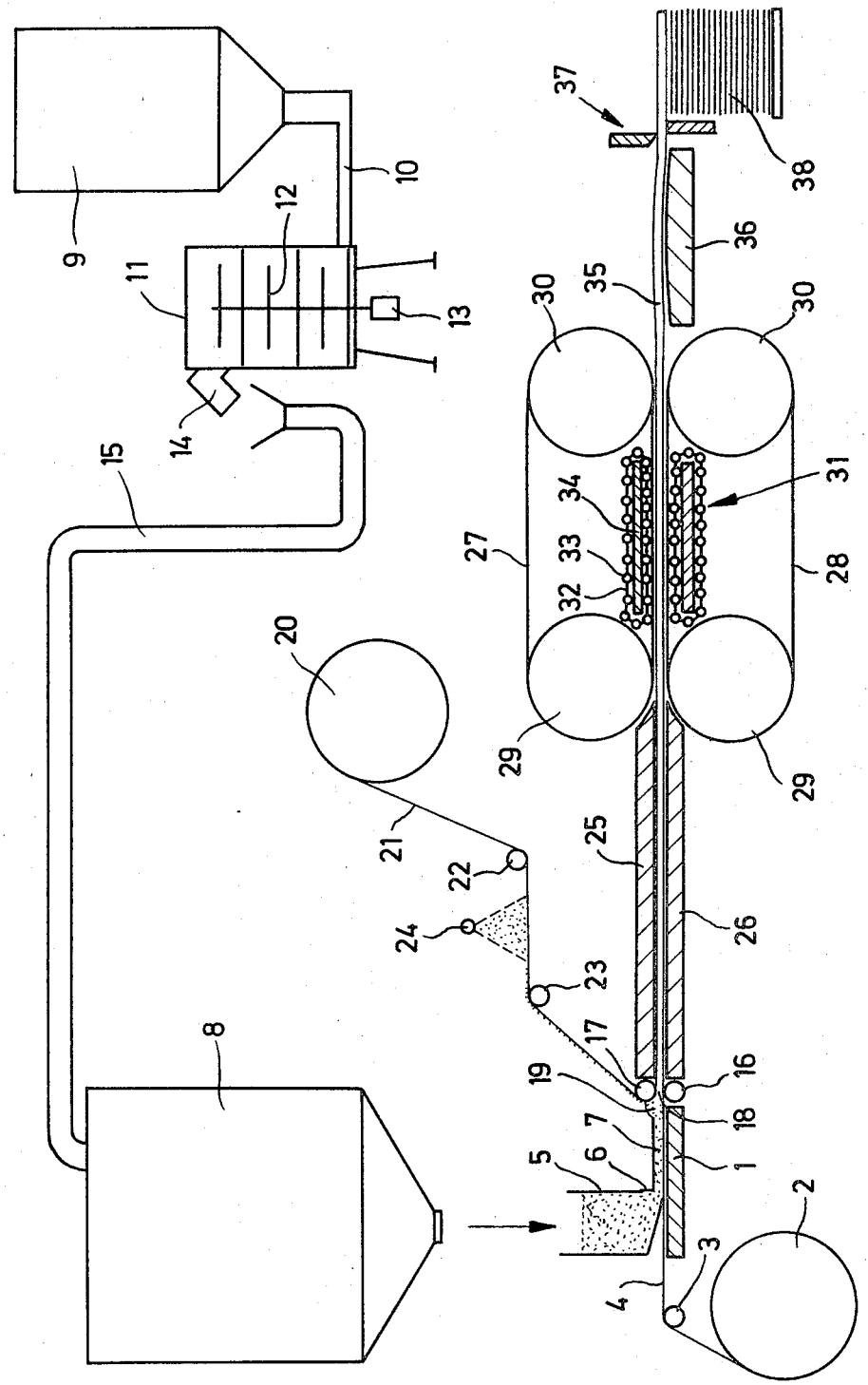

ABSTRACT OF THE DISCLOSURE

A process for the production of a composite packaging material with two outer layers of sheet-form materials bonded to an intermediate layer in which a layer of plastics granulate is continuously poured onto a web from a lower one of the two outer layers. A web forming the upper outer layer is applied to the plastics granulate layer. A bonding agent in the form of a thermoplastic powder is applied to the inside of the outer layers. The whole is heated to a foaming temperature and then left to cool.

The process is carried out in an apparatus which has delivery rollers for the two outer layers and adjustable feed distributors for the granulate and the bonding agent and a heating device. A pair of rollers is arranged in front of the heating device to limit, dam and circulate the granulate.

BACKGROUND OF THE INVENTION

Corrugated cardboard which contains an intermediate corrugated layer of paper between two outer layers of paper, is currently being widely used as a composite material for packaging purposes. Corrugated cardboard is relatively inexpensive and, for this reason, is eminently suitable for use as a packaging material. It has high stiffness in flexure transversely of the corrugations of the centre layer, whilst its stiffness and flexure parallel to the corrugations is of course very much lower.

Numerous attempts have already been made to use plastics in the packaging industry. The practical replacement of corrugated cardboard by plastics has hitherto always failed by reason of the fact that the plastics sheeting proposed as a replacement is either too expensive or does not have the necessary strength. For example, it has been proposed to replace paper webs by extruded plastics sheeting. Unfortunately, this considerably increases the unit weights of the packaging containers, in addition to which cost of plastics webbing or plastics sheeting of this kind is significantly higher than that of corrugated cardboard so that corrugated cardboard is still the preferred material for producing containers, boxes or the like by virtue of its low cost.

In addition, attempts have already been made to replace the intermediate corrugated layer of corrugated cardboard by foam plastics. Unfortunately, it has so far proved to be impossible uniformly to introduce foam plastics between the outer cover layers in a comparatively economic manner and to unite them with these cover layers. Although attempts have been made to cut or slice thin layers off blocks or rolls of foam plastics for subsequent insertion between two paper webs, it is not possible in this way to provide the end product with the necessary strength, especially because the unit weight of the foam plastics layer is the same throughout. Neither have theoretical proposals to pour a layer of plastics granulate onto a substrate and then to foam this layer between the substrate and the cover layer, resulted in useful composite materials, not least because the layer of foam lacks uniformity and adhesion to the cover layers is inadequate.

BRIEF SUMMARY OF THE INVENTION

An object of the present invention is to make it possible economically and effectively to produce a serviceable composite material which can be used for packaging purposes, a so-called foam cardboard, which although equivalent in price to conventional corrugated cardboard, has better properties than corrugated cardboard.

To achieve this object, the invention provides a process of the kind referred to earlier on which is distinguished by the fact that a layer of prefoamed plastic, preferably expanded polystyrene, is scattered continuously onto a web forming the lower cover layer, after which a web forming the upper layer is applied to the plastics layer and the whole heated in a predetermined temperature zone to the foaming temperature and then left to cool. A thermoplastic powder, preferably a hot-melt powder, is added to the plastics material to be foamed before it is heated to act as a bonding agent for retaining the cover layers, being applied to the insides of the cover layers so that the plastics material foams between the two cover layers and, in doing so, is firmly and permanently united therewith.

By virtue of the use, in accordance with the invention, of a prefoamed plastics material as starting material for the intermediate layer of the composite material, it is possible for the foaming process to be uniformly carried out under control in a manner that can always be repeated, with the result that the proposed process can be economically worked. The addition of thermoplastic powder as bonding agent to the prefoamed plastics material before it is foamed to completion affords the advantage that there is no need for a special adhesive to be introduced between the layers to be joined together.

The hot-melt powder used as bonding agent is best applied to the inside of the upper web-foam cover layer and, before this cover layer is applied to the plastics layer to be foamed, is made to adhere thereto, which can be achieved for example by surface fusion under the effect of heat or by electrostatic spraying.

Hot-melt powder is heavier than the relatively light prefoamed plastics material with the result that this powder very quickly sinks to the bottom in the plastics layer which is still being agitated before the heating operation. In the heating zone, the hot-melt powder fuses at the treatment temperature with the resultt that the lower web is firmly united with the expanding plastics layer. However, since some of the hot-melt powder is already adhering to the inside of the upper web, this portion of the hot-melt powder also becomes active as a bonding agent under the effect of the treatment temperature in the heating zone because it is re-softened and hence forms a bond between the top of the foam layer and the upper cover web. At the same time, the hot-melt powder consolidates the peripheral zones of the foam plastics layer, i.e. compresses them towards the cover layers which is extremely favourable so far as the stability and flexural strength of the end product are concerned. By contrast, the central zone of the foamed plastics layer contains hardly any hot-melt powder at all with the result that this zone does not undergo any additional consolidation, nor is this necessary because the centre zone of the foam plastics layer has to withstand the least stressing.

Preferably, the plastics layer to be foamed is gradually heated to the maximum foaming temperature, approximately 95° C., after which it is left to cool, again gradually, to room temperature. The increase in temperature best follows a linear path as does the decrease in temperature. The starting temperature amounts to around 18° C., i.e. corresponds to room temperature. However, there is no need for the work shop to be specially conditioned because the process according to the invention is unaffected by climatic variations because it is sufficient for the pattern followed by the heating temperature and the cooling temperature to be kept within a certain temperature rang of from about ±2 to 5° C.

In another embodiment of the invention, the supply of pre-foam plastics material is regulated in accordance with an accumulation of material built up in front of the heating stage, in other words the heating stage is always immediately preceded by sufficient material to completely fill the gap in the heating stage with material to be foamed. The accumulation of material is circulated to a limited extent by the conveyor-like movement of the cover layers so that the hot-melt powder is distributed in the pre-foaming material in the required manner. Once the accumulation of material has reached a certain level, the supply of pre-foamed plastics material is interrupted by a probe or the like until the accumulation of material has fallen back to below a certain level.

In either case, the foaming operation is carried out in a pre-determined zone, i.e. in a zone that is defined on all sides so that a robust composite material of accurately defined thickness and strength is obtained. The costs involved in the production of this composite material are so favourable that they are equivalent to or even lower than the costs involved in the production of corrugated cardboard.

The invention also provides an apparatus for carrying out the process according to the invention which comprises two delivery rollers for sheet-form upper and lower cover layers, an adjustable-feed distributor for pre-foamed plastics material, a heating means and a limiting means forming a pre-determined throughflow gap for defining the dimensions of the end product. This limiting means is coupled to the heating means, its effect being that the foaming operation is regulated by external counter-pressure in such a way that a composite material with strength properties that are uniform throughout its length and breadth is obtained. The heating means, consisting of heating plates, is preceded by a pair of rollers acting as limiting, damming and circulating means for the plastics granulate and the thermoplastic powder.

DESCRIPTION OF THE DRAWING

The accompanying drawing is a diagrammatic side elevation of one embodiment of an apparatus according to the invention for the continuous production of foam cardboard.

DESCRIPTION OF A PREFERRED EMBODIMENT

The apparatus illustrated comprises a platform 1 over which a paper web 4 supplied from a roll 2 is guided by means of a guide roller 3. Above the platform 1 there is a feed hopper 5 with an adjustable outlet flap 6 for pouring a layer 7 of pre-foamed plastics material on to the paper web 4. The pre-foamed plastics material is introduced into the feed hopper 5 from a silo 8 in which the pre-foamed plastics material has been stored for 24 to 48 hours after the pre-foaming operation. The foam is initially introduced from a silo 9 through a screw conveyor 10 into a steam-operated pre-foaming vessel 11 with built-in stirring mechanism 12 and a driving motor 13. On completion of the prefoaming operation, the plastics material leaves the pre-foaming vessel 11 through an outlet 14 and flows through a pipe 15 into the silo 8.

After the layer 7 of prefoamed foam has been poured on to the lower paper web 4, the paper web 4 thus coated travels to two rollers 16 and 17 which extend over its entire width and which are arranged at such a distance apart that some of the plastics layer which has been poured on is unable to pass through the measuring or metering gap 18 defined by this interval. As a result, an accumulation of material 19 is built up in front of the rollers 16 and 17. This accumulation of material can be probed for example optically or mechanically so that the further supply of prefoamed plastic from the feed hopper 5 can be regulated in dependence upon the level of the accumulated material.

Another paper web 21 is guided downwards from a roll 20, passing over a guide roller 22, a guide means 23 and a roller 17. Behind the rollers 16 and 17, the paper webs 4 and 21 form the upper and lower cover layers of the composite material to be produced.

Between the guide roller 22 and the guide means 23, the upper paper web 21 travels substantially horizontally with the inside face upwards. This inside is sprinkled uniformly with a thin layer of hot-melt powder from a spray or sprinkling attachment 24 arranged above it. The guide means 23 is heated for example to a temperature of 200° C. so that some of the hot melt powder is fused on to the paper web 21 as it passes through whilst the rest of the hot-melt powder remains lying loosely on the paper web 21 and in the vicinity of the roller 17 drops down from the paper web 21 in the prefoamed plastics material. Inside the layer 7 of prefoamed plastics material, the non-fused particles of the hot-melt powder quickly sink to the bottom because these particles are much heavier than the particles of the light prefoamed plastics materials.

Behind the rollers 16 and 17, the web consisting of the two paper webs 4 and 21 and the intermediate layer 7 of prefoamed plastics material passes between two heating plates 25 and 26 which are heated to 100–115° C. so that the foamed plastics material is heated substantially linearly to about 95° C. between these heating plates. This maximum temperature will be reached at the end of the heating plates 25 and 26 after which the temperature of the now fully expanded intermediate layer falls to room temperature, again substantially linearly. The surface of the heating plates 25 and 26 is best highly polished and completely smooth in order on the one hand to guarantee effective transfer of heat and on the other hand to ensure that little or no braking effect is exerted on the paper webs 4 and 21.

Behind the heating plates 25 and 26, there are two endless conveyor belts 27 and 28 for the further transport of the composite material. These conveyor belts each travel around terminal guide rollers 29 and 30 of relatively large diameter so that the track of each of these conveyor belts 27 and 28 which is in contact with the completed composite material is able to absorb the foaming pressure of the composite material over its entire length through an additional supporting means 31. This supporting means consists for example of a revolving, endless roller track 32 built up of individual rollers 33 rotatably mounted between terminal chains and of a centre supporting plate 34. However, where the plastics layer has an extremely low unit weight and hence where the foaming pressure is very low, it is sufficient to use as the supporting means rigidly mounted guide rollers or even plates with a smooth surface providing a certain increased friction level can be accepted.

Behind the conveyor belts 27 and 28 the composite material 35 which is now complete travels over another platform 36 with a slighly convex surface and finally passes to a transverse and longitudinal cutting unit 37 which cuts off from the web of composite material 35 individual sheets which are stacked one on top of the other at 38.

The end product can have any thickness and for this reason alone is suitable for replacing all known types of corrugated cardboard. The centre layer of the composite material also has an extremely low unit weight of up to 20 kg./m.$^3$. Unit weights as low as these cannot be achieved at all with extruded plastics sheeting, nor can they be readily achieved with corrugated cardboard. Practical tests have also shown that the composite material according to the invention meets for the first time all the requirements that are imposed in practice upon the strength and durability of foam-based composite materials.

What is claimed is:

1. A process for the continuous production of a composite material comprising two outer cover layers of paper, cardboard, or other covering sheet materials, adhesively bonded to an intermediate foamed polystyrene core layer, said process comprising the step of
   (a) continuously supplying upper and lower webs of said covering sheet materials;
   (b) continuously depositing a layer of prefoamed granulate polystyrene material upon said lower web;
   (c) applying a thermoplastic, hot melt powder bonding agent to the inner surface of said upper covering sheet material and heating said powder to adhere a portion thereof to said sheet, a portion of said powder initially deposited on said upper covering sheet and non-adhered thereto, being heavier than said prefoamed polystyrene material, is permitted to sink by gravity to said lower covering sheet;
   (d) thereafter superimposing said upper web upon the deposited layer of prefoamed polystyrene granulate material;
   (e) thereafter heating said deposited polystyrene granulate material and said upper and lower covering webs in a heating zone to an elevated temperature sufficient to effect the foaming of said granulate material and the fusion of said hot melt bonding agent, thereby simultaneously forming a core layer of expanded foamed granules and adhering the same to the covering webs;
   (f) thereafter cooling said adhesively united foamed core and covering webs.

References Cited

UNITED STATES PATENTS

| | | | |
|---|---|---|---|
| 3,043,627 | 7/1962 | Torjusen | 264—46 X |
| 3,501,558 | 3/1970 | Manters | 264—47 |
| 2,962,407 | 11/1960 | Aykanian | 264—47 |
| 3,457,205 | 7/1969 | Nonweiler | 264—45 X |
| 2,950,505 | 8/1960 | Frank | 264—45 |
| 3,616,172 | 10/1971 | Rubens | 264—46 X |
| 2,865,800 | 12/1958 | Stastny | 264—46 |
| 2,954,589 | 10/1960 | Brown | 264—46 |
| 3,037,897 | 6/1962 | Pelley | 264—47 X |

DONALD E. CZAJA, Primary Examiner

H. S. COCKERAM, Assistant Examiner

U.S. Cl. X.R.

161—161, 162, 238; 264—45, 112, 135; 425—4 C